United States Patent [19]

Riddel

[11] 4,174,727

[45] Nov. 20, 1979

[54] VACUUM LATCHING DUMP VALVE

[75] Inventor: John W. Riddel, Fenton, Mich.

[73] Assignee: General Motors Corporation, Detroit, Mich.

[21] Appl. No.: 940,639

[22] Filed: Sep. 8, 1978

[51] Int. Cl.² ............................................. F02M 37/00
[52] U.S. Cl. .............................. 137/111; 137/DIG. 8; 180/175
[58] Field of Search .................. 137/111, DIG. 8; 123/103 R; 180/108, 109

[56] References Cited

U.S. PATENT DOCUMENTS

| | | |
|---|---|---|
| 3,088,538 | 5/1963 | Brennan et al. |
| 3,125,178 | 3/1964 | Stoltman et al. |
| 3,196,904 | 7/1965 | Schniers. |
| 3,216,447 | 11/1965 | Stoltman. |
| 3,354,873 | 11/1967 | Burnell. |
| 3,419,105 | 12/1968 | Hagler et al. |
| 3,451,651 | 6/1969 | Rood. |
| 3,524,516 | 8/1979 | Bemmann. |

Primary Examiner—Gerald A. Michalsky
Attorney, Agent, or Firm—D. D. McGraw

[57] ABSTRACT

A vacuum and atmospheric air pressure actuated valve assembly which prevents re-energization of the servo-motor of a vacuum actuated vehicle road speed control system after the brakes have been applied and the road speed control system de-energized. The device requires manual opening movement of the throttle valve by movement of the accelerator pedal, or stopping of the engine, to decrease the amount of vacuum sufficiently to let the device re-set to a condition which will permit the road speed control system to be re-energized.

2 Claims, 1 Drawing Figure

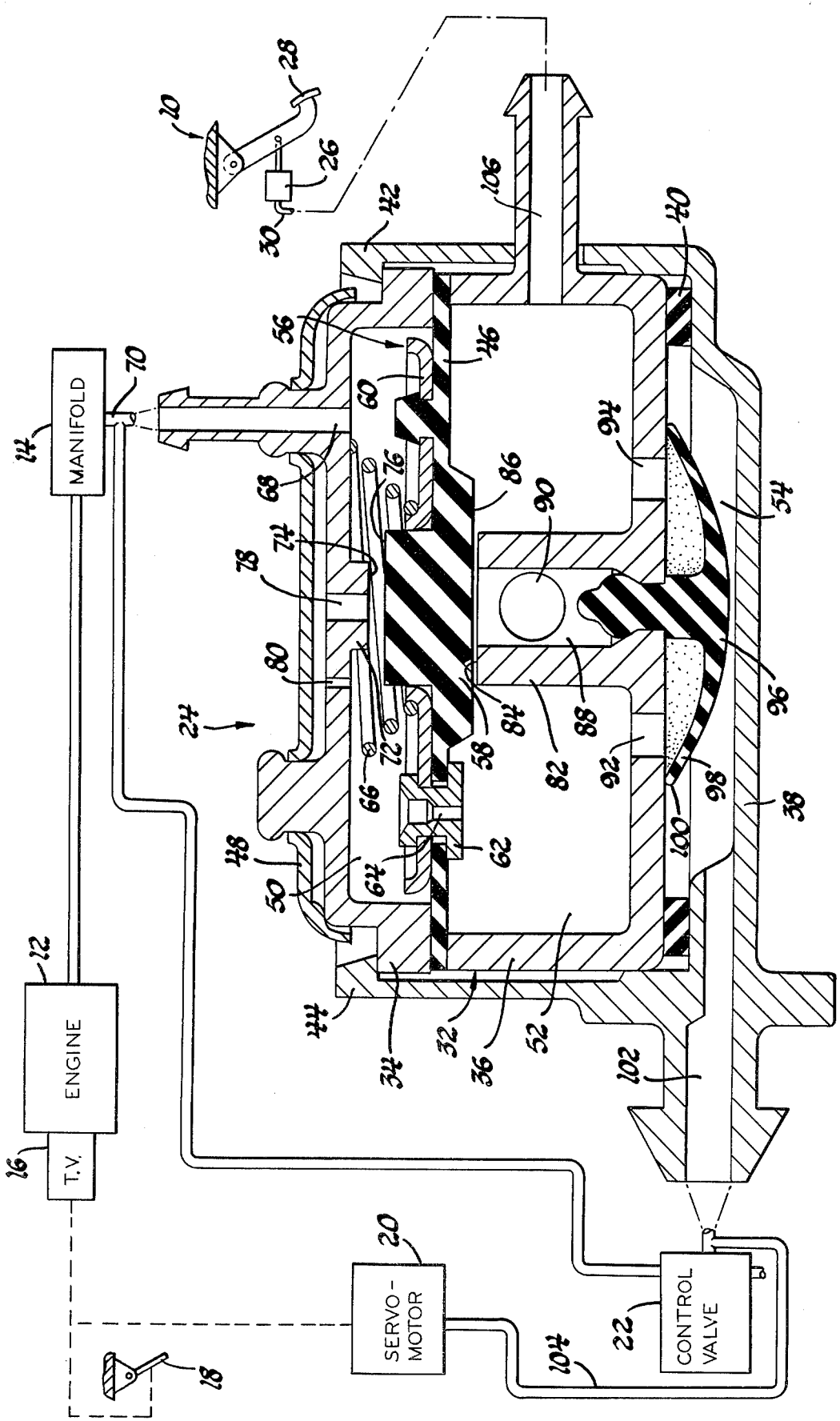

VACUUM LATCHING DUMP VALVE

The invention relates to a valve assembly which has a vacuum operated arrangement preventing reenergization of a vacuum powered servomotor in a vehicle cruise control system after the vehicle brakes have been applied and the system deenergized, by requiring manual opening movement of the throttle valve by movement of the accelerator pedal, or stopping the engine, to release the vacuum latch.

IN THE DRAWING

The single FIGURE is a schematic representation of a vehicle cruise control system containing a valve assembly embodying the invention, the valve assembly being shown in section.

The cruise control system of the vehicle 10 is of any suitable type. For example, it may be similar to one of the types disclosed in U.S. Pat. No. 3,088,538 or No. 3,419,105. The vehicle engine 12 has an intake manifold 14 which serves as a source of vacuum for the cruise control system. Engine 12 is controlled by the throttle valve 16, which is controllable in the usual manner by accelerator pedal 18. The cruise control servomotor 20 is connected to move the throttle valve 16 to maintain a set vehicle speed when the cruise control system is activated. The cruise control system includes a control valve 22 which controls the pressure delivered to servomotor 20 when the system is activated. As is well-known in the art, the control valve 22 may be sensitive to actual vehicle speed and the desired vehicle speed and operate to maintain the actual vehicle speed substantially equal to the desired vehicle speed under varying road load conditions. The control valve is provided with air at atmospheric pressure and with subatmospheric pressure generated in the engine intake manifold 14. From these pressures it generates the control pressure delivered to the servomotor 20, subject to action of the vacuum dump latch and release valve assembly 24. The cruise control system includes a normally closed, brake pedal opened, dump valve 26 connected with the brake pedal 28 so that when the vehicle brake system is actuated by movement of the brake pedal, atmospheric air enters the valve assembly 24 through valve 26 and the conduit 30.

Valve assembly 24 includes a housing 32 illustrated as being composed of a housing upper section 34, a housing middle section 36, and a housing lower section 38. An annular seal 40 between the housing lower section 38 and housing middle section 36 maintains a space relationship between these housing sections and a resilient force which assists clamps 42 and 44, formed as parts of housing lower section 38 and extending upwardly, in holding the housing upper section and housing middle section in assembled relation on the housing lower section. A flexible diaphragm 46 is positioned between the housing upper section 34 and the housing middle section 36 and is held in clamped relation between these housing sections by clamps 42 and 44. A cover 48 is secured to the top side of housing upper section 34 so that it permits atmospheric air to circulate above the housing upper section but minimizes the entry of dust and other foreign particles. An air filter may also be provided if desired.

The housing upper section 34 and the diaphragm 46 jointly define a first chamber 50. Similarly, the housing middle section 36 and the diaphragm 46 define a second chamber 52. Another chamber 54 is defined by the lower part of housing middle section 36, housing section 38 and seal 40.

Diaphragm 46 is part of a differential pressure responsive means 56 which includes a valve member 58 formed integrally with and centrally of the diaphragm 46, a support plate 60 mounted on the side of the diaphragm facing chamber 50, and a rivet 62 with a restrictive orifice 64 formed therethrough. Rivet 62 extends through aligned apertures in the diaphragm 46 and the plate 60 so that orifice 64 provides restrictive fluid communication between chambers 50 and 52. A compression spring 66 is positioned in the first chamber 50 and seats on plate 60 at one end and on the housing upper section 34 on the other end so that it continually urges the valve member 58 in a direction away from housing upper section 34.

A port 68 is formed in the housing upper section 34 and is connected by conduit 70 to the engine intake manifold 14. Housing upper section 34 has a boss 72 extending slightly into chamber 50 and provided with an end surface 74 which is engageable by the surface 76 of valve member 58. A first atmospheric air bleed port 78 extends through boss 72 with one end opening into chamber 50 and the other end opening under cover 48 so as to be connected with atmospheric air. A second atmospheric air bleed port 80 is formed through the housing upper section 34 so that it also connects under cover 48 with atmospheric air and opens into chamber 50. Port 80 is laterally displaced from port 78 so that it does not open through the boss 72, but is connected to chamber 50 adjacent the boss base. Therefore when surface 76 engages the boss end surface 74, port 78 will be closed but port 80 will not be closed.

The housing middle section 36 has a boss 82 extending into chamber 52 and terminating in an end surface 84 which is engageable by surface 86 of valve member 58. Surface 86 is on the opposite side of the valve member from surface 76 and boss end surfaces 74 and 84 are axially spaced so that the valve member 58 cannot engage both bosses concurrently. Spring 66 will normally hold valve member surface 86 in sealing engagement with boss end surface 84. A passage 88 is formed through boss 82 and opens through end surface 84 at one end and into chamber 54 at the other end. A port 90 extends outwardly of housing middle section 36 so that atmospheric air is supplied in a substantially unrestricted manner to passage 88. Openings 92 and 94 extend through the bottom of housing middle section 36 to connect chamber 52 with chamber 54. An umbrella type check valve 96 is secured in one end of passage 88 to seal that passage relative to chamber 54 and to position the umbrella flap 98 over openings 92 and 94 so that when the flap edge 100 engages the lower side of housing middle section 36, there is no fluid connection from chamber 52 through openings 92 and 94 beyond the check valve. However, when the flap 98 is moved away from housing middle section 36, a substantially free flowing connection is provided through openings 92 and 94 from chamber 52 to chamber 54. A port 102 connects chamber 54 outwardly of the check valve 96 with the cruise control system servomotor 20 through the conduit 104, which conducts control pressure from valve 22 to the servomotor. Another port 106 formed through one side of housing middle section 36 connects conduit 30 with chamber 52.

When the cruise control system is in operation, intake manifold vacuum is introduced into control valve 22 and into chamber 50 of valve assembly 24 through port 68. Air at atmospheric pressure is also introduced into chamber 50 through ports 78 and 80. Spring 66 holds valve member 58 in sealing engagement with the end surface 84 of boss 82 so that no atmospheric pressure from port 90 is permitted in chamber 52. Since both ports 78 and 80 are open, the manifold vacuum supplied to chamber 50 is insufficient to decrease the absolute pressure in chamber 50 to such an extent that spring 66 will be compressed and valve member 58 removed from boss 82. Valve 26 is closed. Conduit 104 and port 102 conduct the cruise control pressure delivered to the servomotor 20 by control valve 22 to chamber 54. Due to the action of restrictive orifice 64, chamber 52 will be at a pressure almost the same as the control pressure but intermediate the subatmospheric cruise control pressure in chamber 54 and the subatmospheric pressure in chamber 50. Therefore check valve 96 will be open and there will be a small flow of air, limited by the area of restrictive orifice 64, from chamber 52 to chamber 54 and out port 102. This therefore is a negligible effect on the servomotor 20, however, since it will cause only a slight change in the pressure that would occur if restrictive orifice 64 were completely closed.

When the vehicle operator actuates the brake pedal 28, valve 26 is immediately opened and atmospheric pressure is introduced into chamber 52 through port 106. This will set up a larger pressure differential across diaphragm 46. The force generated by this pressure differential is sufficient to overcome the bias of spring 66, and valve member 58 will move away from boss 82 and toward boss 72. This immediately opens atmospheric port 90 to chamber 52 so that atmospheric air pressure is fully established in chamber 52. Valve member 58 seats against boss end surface 74, closing port 78, and therefore substantially decreasing the amount of atmospheric air pressure bled into chamber 50 and further decreasing the absolute pressure in that chamber. The atmospheric air pressure in chamber 52 will flow through openings 92 and 94 past check valve 96 and immediately bring the control pressure in servomotor 20 to atmospheric pressure independently of control valve 22. The cruise control system is therefore deactivated and the servomotor 20 will no longer urge the throttle valve 16 open. Instead, the throttle valve will return toward the closed throttle position.

Upon release of the brake pedal 28, valve 26 is closed. However, since port 90 and passage 88 provide a substantially unrestricted connection of atmospheric air pressure to chamber 52, atmospheric air pressure continues to be applied through chamber 54, port 102 and conduit 104 to the servomotor 20. When the throttle valve 16 was released by the servomotor 20, it moved toward the closed throttle position, causing engine 12 to generate an even higher intake manifold vacuum so that the absolute pressure in chamber 50 is further decreased, increasing the pressure differential across diaphragm 46 and continuing to hold valve member 58 against boss 72. The areas of ports 68, 78 and 80 and orifice 64 are such that normal engine operation of the manifold vacuum will be sufficient to maintain the pressure differential across diaphragm 46. Thus the dumping action of valve assembly 24 is latched in the dumped position by manifold vacuum.

Release from this inactivated state can only be achieved by manual actuation of the throttle valve so as to decrease manifold vacuum, or by stopping the engine. Release is obtained when the subatmospheric pressure in chamber 50 no longer overcomes the force of spring 66.

When the operator desires to condition the dump valve for reactivation of the cruise control system, he opens the throttle valve 16 by depressing the accelerator pedal 18 so that manifold vacuum decreases to such an extent that the subatmopheric pressure in chamber 50 is no longer capable of maintaining a sufficient pressure differential across diaphragm 46 to resist the force of spring 66. The spring will therefore move valve member 58 away from boss 72, immediately opening port 78 and therefore further increasing the absolute pressure in chamber 50 and still further lessening the pressure differential across diaphragm 46. Valve member 58 will engage boss 82 and close passage 88. The accelerator pedal is then relaxed and the throttle valve 16 returns to a normal operating position. Manifold vacuum then provided to chamber 50 is sufficient, even with ports 78 and 80 opened, to cause a subatmospheric pressure to be in chamber 50. With valve 26 and passage 88 closed, the subatmospheric pressure will be connected through restrictive orifice 64 to create a subatmospheric pressure in chamber 52. This will immediately act on check valve 96, in conjunction with atmospheric pressure in chamber 54, to close the check valve 96 so that there is no fluid communication from chamber 54 to chamber 52. Therefore the control valve 22 may again generate a control pressure in servomotor 20 when the system is reactivated. The same result may be accomplished by stopping the engine so that atmospheric pressure exists in chambers 50 and 52, permitting spring 66 to move valve member 58 to close passage 88. When the engine is thereafter started and running again, manifold vacuum will act through chamber 50, orifice 64, chamber 52, and openings 92 and 94 to close check valve 96. The valve assembly 24 will therefore be in condition to permit activation of the cruise control system as before.

The amount of manifold vacuum at release is determined by the force of spring 66 and the areas of ports 68, 78 and 80. In a typical system, port 68 may have a diameter of about 1 mm to prevent excessive loss of vacuum to the engine. Port 68 may have a diameter of about 0.5 mm so that the vacuum buildup in chamber 52 will be delayed upon engine start-up so that the valve assembly will latch in the "no cruise" state wherein port 78 is closed. Port 80 should be of such size that the spring-diaphragm force balance occurs with an engine intake manifold vacuum of about 8 to 9 inches of mercury. Since normal cruise generates an average manifold vacuum of 9 to 12 inches of mercury, it would be very difficult to accelerate the vehicle to cruise speed without shifting valve assembly 24 to the "enable cruise" state wherein passage 88 and port 90 are closed. The size of port 78 should be such that the spring-diaphragm force balance occurs, with port 78 open and the valve 26 open, at a manifold vacuum of about 15 inches of mercury.

The valve assembly 24 will eliminate unexpected accelerations which may occur if the control valve or the speed transducer of the cruise control system malfunctions. If valve assembly 24 malfunctions, the cruise control system either reverts to its original modes, or it causes the servomotor to remain open to atmospheric air pressure so that it cannot be activated. In normal operation once valve assembly 24 has dumped control pressure from the servomotor, it remains dumped at least until the vehicle operator pushes on the accelerator.

What is claimed is:

1. A vacuum dump latch and release valve assembly having a port adapted to be connected to a vacuum actuated member required to be selectively dumped to atmospheric pressure, said assembly also having means adapted to be connected to a source of vacuum and to atmospheric air pressure and to a dump valve openable to connect said assembly to atmospheric pressure and closable to disconnect said assembly from atmospheric pressure, said assembly comprising:

differential pressure responsive means having valve portions movable in response to opening of the dump valve to a condition connecting said port to atmospheric air pressure independently of subsequent closure of the dump valve;

said differential pressure responsive means being maintained in said condition in response to said atmospheric air pressure and at least one of said valve portions being so maintained at least partially in response to vacuum pressure from the vacuum source;

said one of said valve portions of said differential pressure responsive means also being responsive to a sufficient change in vacuum pressure from the vacuum source approaching atmospheric air pressure, with the dump valve closed, to cause said differential pressure responsive means to change to another condition to close said port against connection with atmospheric air pressure through said assembly, said differential pressure responsive means remaining in said another condition until said dump valve is again opened.

2. A valve assembly comprising:

a housing having a movable wall therein movable in response to differential pressures acting thereacross and dividing said housing into first and second chambers;

said first chamber being adapted to be connected to vehicle engine intake manifold vacuum and having first and second atmospheric air bleed ports;

said second chamber having third and fourth and fifth ports adapted to be selectively opened and closed and a restrictive orifice providing continuous restrictive fluid communication with said first chamber;

first valve means on said movable wall having yieldable force exerting means acting thereon and urging said first valve means to a position closing said third port, said first valve means being movable by said movable wall against the force of said yieldable force exerting means in response to a pressure differential acting across said movable wall to open said third port and close said first port;

second valve means between said second chamber and said fifth port acting to close communication between said second chamber and said fifth port in response to a pressure differential between said second chamber and said fifth port when said second chamber contains the lesser pressure;

said valve assembly having one condition when manifold vacuum is connected to said first chamber to open said first and second ports to place said first chamber in sufficient communication with atmospheric air so that in combination with said manifold vacuum a first subatmospheric pressure is established therein, said third and fourth and fifth ports being closed;

said valve assembly having a second condition initiated by the opening of said fourth port to deliver full atmospheric pressure into said second chamber, causing said second valve means to open and provide atmospheric air pressure communication from said second chamber to said fifth port, and causing said movable wall to move in response to the increased pressure differential thereacross against the force of said yieldable force exerting means and moving said first valve means to open said third port to communicate said second chamber with full atmospheric air pressure through said third port independently of said fourth port and to close said first port but not said second port; the closure of said first port decreasing the atmospheric air communication into said first chamber and establishing a second subatmospheric pressure therein at less pressure then than said first subatmospheric pressure and approaching engine intake manifold vacuum; the pressure differential across said movable wall being the difference between atmospheric air pressure in said second chamber and said second subatmospheric air pressure in said first chamber, and being sufficient to maintain said movable wall in the position holding said first port closed and said third port open;

and a third condition wherein engine intake manifold vacuum sufficiently approaches atmospheric air pressure to cause the pressure in said first chamber to sufficiently approach atmospheric air pressure so that the pressure differential acting across said movable wall is no longer sufficient to oppose said yieldable force exerting means, said yieldable force exerting means then moving said movable wall and said first valve means to open said first port and close said third port so that, when said fourth port is closed, sufficient subatmospheric pressure is thereafter communicated from said first chamber to said second chamber by means of said restrictive orifice to close said second valve means.

* * * * *